Oct. 13, 1953　　　　R. B. BARNES ET AL　　　　2,655,452
GLASSES, COMPOSITIONS THEREOF, ARTICLES EMBODYING SAID
GLASSES, AND METHOD OF MAKING AND USING THE SAME
Filed May 13, 1950　　　　　　　　　　　　　　　5 Sheets-Sheet 1

INVENTORS
ROBERT BOWLING BARNES
WALTER A. FRASER
BY
ATTORNEY

Patented Oct. 13, 1953

2,655,452

UNITED STATES PATENT OFFICE 2,655,452

GLASSES, COMPOSITIONS THEREOF, ARTICLES EMBODYING SAID GLASSES, AND METHOD OF MAKING AND USING THE SAME

Robert Bowling Barnes, Stamford, and Walter A. Fraser, Ridgefield, Conn., assignors to American Optical Company, Southbridge, Mass., a voluntary association of Massachusetts Application May 13, 1950, Serial No. 161,884

16 Claims. (Cl. 106—52)

This invention relates to improvements in glasses having controlled absorptive characteristics as to visible and invisible portions of the spectrum and further including other injurious rays, and has particular reference to novel compositions and method of making the same.

The glass of the present invention, among its many uses, deals with several problems which have been encountered in television, particularly those introduced by the visual screen of the cathode ray tube on which the image is formed as a result of the bombardment of the fluorescent coating of said screen by an electron beam.

Among the various difficulties which have been encountered, the following seem to be the most troublesome:

A. The provision of good discrimination between grays and blacks in the image and, therefore, desirable contrast.

B. Elimination of diffusion introduced by halations resulting from reflections of the light emanating from the fluorescing particles of the screen of the tube.

C. The altering of the visible ray transmission to obtain a more practical level of transmission for introducing greater visual comfort without substantially or perceptibly affecting the color of the image.

D. The maintenance of the threshold of vision of observers at substantially the normal levels.

E. Elimination of harmful X-ray radiation.

F. Elimination of reflections from sources outside the tube.

Some attempts have been made to deal with some of the problems set forth above but it is a principal object of the present invention to provide a glass composition, and method of making and using the same whereby substantially all of the above difficulties are greatly reduced.

Another object is to provide a glass composition suitable for use in forming the face portion of a cathode ray tube or in forming filters for use with such tubes, and method of making and using the same whereby the above difficulties are greatly reduced or eliminated.

Another object is to provide a glass of the above nature having its transmission characteristics controlled so as to render the visible portion of the spectrum such as to increase contrast discrimination of the image, and to provide absorption of ultra-violet rays to the extent that a substantially normal threshold of vision is maintained.

Another object is to provide a glass of the above character having controlled absorptive characteristics with respect to X-rays generated in the cathode ray tube.

Another object is to provide a cathode ray tube face or filter of glass of the above character having a reflection-reduction coating on the outer surface thereof for reducing reflection of external light and for absorbing the reflection of internal light.

Another object is to provide a cathode ray tube with a face portion embodying a composite laminated structure in which one of the laminae is of a glass formed in accordance with this invention.

Another object is to provide a cathode ray tube for use in television having its face portion formed of glass of the above character, with said face portion having a transparent coating on the inner surface thereof on which the coating of particles of fluorescent material is placed and further having a reflection-reduction coating on the outer surface thereof and embodying additional means for effectively eliminating the internal light reflected from the face of the tube at angles greater than the critical angle.

Other objects and advantages of the invention will become apparent from the following description taken in connection with the accompanying drawings in which.

Figure 1:
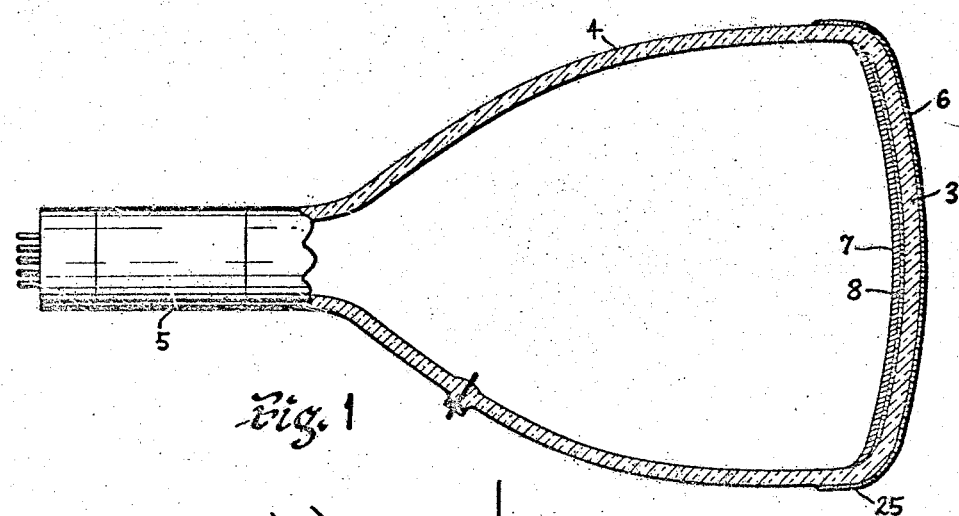
Fig. 1 is a side elevational view, partially in section, of a television tube illustrating an embodiment of the invention.

Referring more particularly to the drawings wherein like characters of reference designate like parts throughout the views, in Fig. 1 there is illustrated a conventional type television cathode ray tube or kinescope having a face portion 3 formed of glass embodying the invention, cone-shaped side walls 4, and a neck portion 5 having a conventional electron gun (not shown) mounted therein and disposed so as to expel a beam of electrons toward said face portion. The cone-shaped walls 4 may be formed of glass, metal, or other desirable material in the conventional manner with the glass face portion 3 being secured in sealed relation thereto.

The face portion 3 formed of the glass embodying the invention has a fluorescent screen 7 formed either directly on the inner surface thereof or on a coating 8 of transparent material disposed on the inner surface of the glass. In the latter instance, the transparent coating 8 is adapted to space the screen 7 from the inner surface of the face portion 3 and the function thereof will be described in detail hereinafter. A reflection reduction coating 6 may be formed on the outer surface of the face portion of the tube.

It has been described above that the conical wall portions 4 may be formed of glass. In such instances, however, the glass of said wall portions may be those which are now in common commercial use and need not be of the glass embodying the invention.

In dealing with the various difficulties set forth above, the glass embodying the invention preferably has the following characteristics:

1. Transmission in the visible portion of the spectrum ranging approximately from 45% to 70% at 400 millimicrons, 58% to 76% at 500 millimicrons, 50% to 71% at 600 millimicrons, and 67% to 80% at 700 millimicrons, and with an average white of from 60% to 75%.

2. Transmission in the ultra-violet portion of the spectrum of approximately from 2% to 31% at 370 millimicrons, approximately from 0 to 13% at 360 millimicrons, approximately from 0% to 3.5% at 350 millimicrons, and with substantially no transmission below 350 millimicrons.

3. Absorption in the X-ray portion of the spectrum of substantially all X-rays generated thereby.

These transmission and absorption values apply to glasses embodying the invention when produced and measured in thicknesses of from 5 to 6½ millimeters. However, in certain instances it may be permissible to vary the above specifications in accordance with the results desired and the thickness of the article.

According to the teachings of this invention, a soda-potash-lime-silica base glass batch will have added thereto controlled amounts of the oxides of lead, manganese, vanadium, copper and silver for obtaining the desired color and ultra-violet absorption characteristics in the resultant glass. Inclusion of boric acid will also aid in the melting, making the glass more fluid and improving the chemical durability.

The following table lists the ingredients which may be used in producing a batch which when melted in the manner to be described hereinafter will result in a crown glass having desired characteristics:

*Table A*

| Ingredients | Amounts, percent |
|---|---|
| Silica ($SiO_2$) | 60–72 |
| Boric oxide ($B_2O_3$) | 0–7 |
| Soda ($Na_2O$) Potash ($K_2O$) | 14–20 |
| Lime ($CaO$) Lead oxide ($PbO$) | 9–11 |
| Vanadium oxide ($V_2O_5$) | 0.05–0.15 |
| Manganese oxide ($MnO_2$) | 0.4–1.4 |
| Silver oxide | 0–1.2 |
| Copper oxide | 0–0.4 |

To the batch ingredients are added suitable fining agents such as antimony oxide, arsenic oxide, or sodium chloride in an amount ranging approximately from .5% to 2%, and the vanadium oxide and manganese oxide and/or copper oxide and silver oxide are included for controlling the resultant color and ultra-violet absorbing characteristics.

In preparing batches for producing glasses in accordance with this invention, it has been found that the silica content should be provided in amounts ranging between 60% and 72% since when using more than 72% the batch will tend to be viscous while less than 60% will result in a glass which is not chemically durable.

The boric oxide is used to help in the melting by making the glass a little more fluid and tending to improve the chemical durability. However, it should be held to not more than 7% since larger amounts produce undesirable characteristics in the glass.

Soda and potash are included in amounts ranging approximately from 14% to 20%, part as carbonate and part as nitrate, although only nitrate may be used, if desired. However, such an alkali should be controlled in accordance with the amount of boric oxide used; that is, the boric oxide should be low or not used at all with a high alkali content, but putting in boric oxide and decreasing the alkali gives better chemical durability.

The total lime and lead oxide contents should be held to approximately between 9 and 11%. However, the lead oxide may be substituted in whole for the lime if desired; also, lime can be used without any lead oxide. Combining lime with lead oxide improves the chemical stability of the glass.

However, since the lead oxide content is responsible for producing the desired X-ray absorption, it is necessary to include it in amounts of at least 3% PbO whereupon the resultant glass will absorb substantially all the X-rays generated by 40,000 volt electrons. This is sufficient absorption for present purposes since it is believed that the present invention will generally be used with lower electron voltages such as the conventional television kinescope tubes which generate a maximum of approximately 36,000 volt electrons.

The manganese oxide and vanadium oxide together control the visible color and the amounts used must be carefully controlled. The vanadium oxide should be provided in an amount in accordance with the ultra-violet absorption desired. Then the manganese oxide is added to get a substantially neutral colored glass. Since it has been found that manganese oxide, when used in substantially large quantities, will produce a glass having a transmission curve exhibiting a marked dip in the center or yellow-green region, it is preferable to provide the manganese oxide in greater quantities than the vanadium oxide to get the desired balance and produce a glass having the desired transmission curve. The manganese oxide may be varied approximately from 4 to 12 times the amount of vanadium oxide depending upon the transmission desired and the thickness of the glass to be produced and is included in amounts ranging from approximately 0.5 to 1.4%. The vanadium oxide content will be within the range of from approximately 0.05% to 0.15%.

It has been found, however, that a more level curve can be made to exist in the visible spectrum by including controlled amounts of copper oxide in the batch mixture which will produce a glass having less transmission in the red region of the spectrum. It has also been found that additions to the batch mixture of silver oxide reduces the ultra-violet transmission with substantially little if any effect upon the visible spectrum. Copper oxide can be included in amounts ranging approximately from 0.05% to 0.4% and silver oxide approximately from 0.1% to 0.2%. Large amounts of copper oxide will cause high points to exist in the blue-green portion of the spectrum which may be corrected by reduction of vanadium in the batch mixture, the reduction being proportionate to the amount of vanadium oxide in the batch as the amount of increase in the copper oxide is proportionate to the total amount of copper oxide in the batch.

The following Table B lists several different batch mixtures which may be used to form satisfactory glasses in accordance with this invention:

*Table B*

| Ingredients | Amounts in percent | | | | | | |
|---|---|---|---|---|---|---|---|
| | Batch A | Batch B | Batch C | Batch D | Batch E | Batch F | Batch G |
| Silica (SiO$_2$) | 67.8 | 67.8 | 67.8 | 67.8 | 67.35 | 66.8 | 66.25 |
| Boric oxide (B$_2$O$_3$) | 4.0 | 4.0 | 4.0 | 4.0 | 4.0 | 4.0 | 4.0 |
| Soda (Na$_2$O) | 9.0 | 9.0 | 9.0 | 9.0 | 9.0 | 10.0 | 10.0 |
| Potash (K$_2$O) | 7.0 | 7.0 | 7.0 | 7.0 | 7.0 | 7.0 | 7.0 |
| Lime (CaO) | 7.0 | 7.0 | 7.0 | 7.0 | 0.0 | 7.0 | 7.0 |
| Lead oxide (PbO) | 3.0 | 3.0 | 3.0 | 3.0 | 10.0 | 3.0 | 3.0 |
| Antimony oxide (Sb$_2$O$_3$) | 1.5 | 1.5 | 1.5 | 1.5 | 1.5 | 1.5 | 1.5 |
| Manganese oxide (MnO$_2$) | 0.6 | 1.0 | 0.6 | 1.0 | 1.0 | 1.0 | 1.0 |
| Vanadium oxide (V$_2$O$_5$) | 0.15 | 0.15 | 0.1 | 0.1 | 0.15 | 0.15 | 0.15 |
| Copper oxide (CuO) | 0.0 | 0.0 | 0.0 | 0.0 | 0.0 | 0.0 | 0.1 |
| Silver oxide (Ag$_2$O) | 0.0 | 0.0 | 0.0 | 0.0 | 0.0 | 0.1 | 0.0 |

| Ingredients | Amounts in percent | | | | | |
|---|---|---|---|---|---|---|
| | Batch H | Batch I | Batch J | Batch K | Batch L | Batch M |
| Silica (SiO$_2$) | 66.25 | 65.25 | 66.92 | 66.92 | 66.92 | 66.92 |
| Boric oxide (B$_2$O$_3$) | 4.0 | 4.0 | 4.0 | 4.0 | 4.0 | 4.0 |
| Soda (Na$_2$O) | 10.0 | 10.0 | 10.0 | 10.0 | 10.0 | 10.0 |
| Potash (K$_2$O) | 7.0 | 7.0 | 7.0 | 7.0 | 7.0 | 7.0 |
| Lime (CaO) | 7.0 | 7.0 | 7.0 | 7.0 | 7.0 | 7.0 |
| Lead oxide (PbO) | 3.0 | 3.0 | 3.0 | 3.0 | 3.0 | 3.0 |
| Antimony (Sb$_2$O$_3$) | 1.5 | 1.5 | 1.5 | 1.5 | 1.5 | 1.5 |
| Manganese oxide (MnO$_2$) | 1.2 | 1.4 | 0.5 | 0.5 | 0.5 | 0.6 |
| Vanadium oxide (V$_2$O$_5$) | 0.10 | 0.08 | 0.08 | 0.08 | 0.08 | 0.10 |
| Copper oxide (CuO) | 0.10 | 0.10 | 0.0 | 0.05 | 0.05 | 0.10 |
| Silver oxide (Ag$_2$O) | 0.0 | 0.20 | 0.0 | 0.0 | 0.10 | 0.10 |

Glasses produced from the above formulae have outstanding characteristics with respect to all the practical criteria, the chemical durability is good, and the glasses have a desirable co-efficient of expansion which renders them readily fusible with other stable glasses.

In producing glasses from the above batch mixes, the melting can be done in a relatively short time at temperatures ranging between 2600° to 2775° F. or the temperatures can be dropped by 50° to 100° F and the batches melted for a length of time ranging from 6 to 2½ hours. It will be noted, however, that the batches are melted under oxidizing conditions in any conventional induction electric, gas-fired, or other type of furnace.

Figure 5:
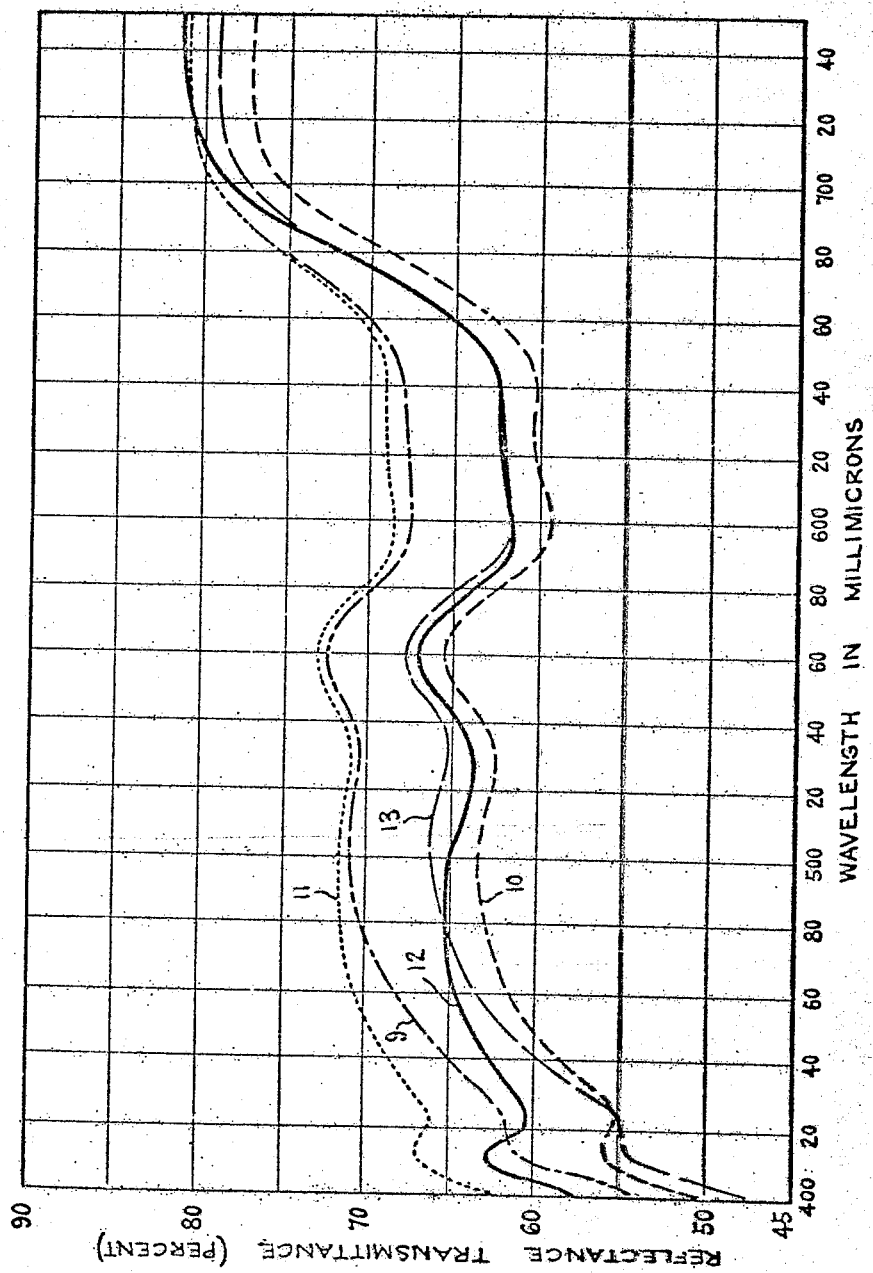
Figs. 5, 6 and 7 are charts illustrating the spectral transmission curves of several glasses embodying the invention.

The resultant glasses produced by melting the batches A through D at temperatures held between 2635–2700° F. for 1½ hours, and batch E at temperatures held between 2600–2700° F. for 1 hour 35 min., will possess visual transmission characteristics as illustrated in Fig. 5. The curve indicated by numeral 9 illustrates the visual transmission of the glass of batch A, curve 10 of batch B, curve 11 of batch C, curve 12 of batch D, and curve 13 of batch E.

Figure 6:
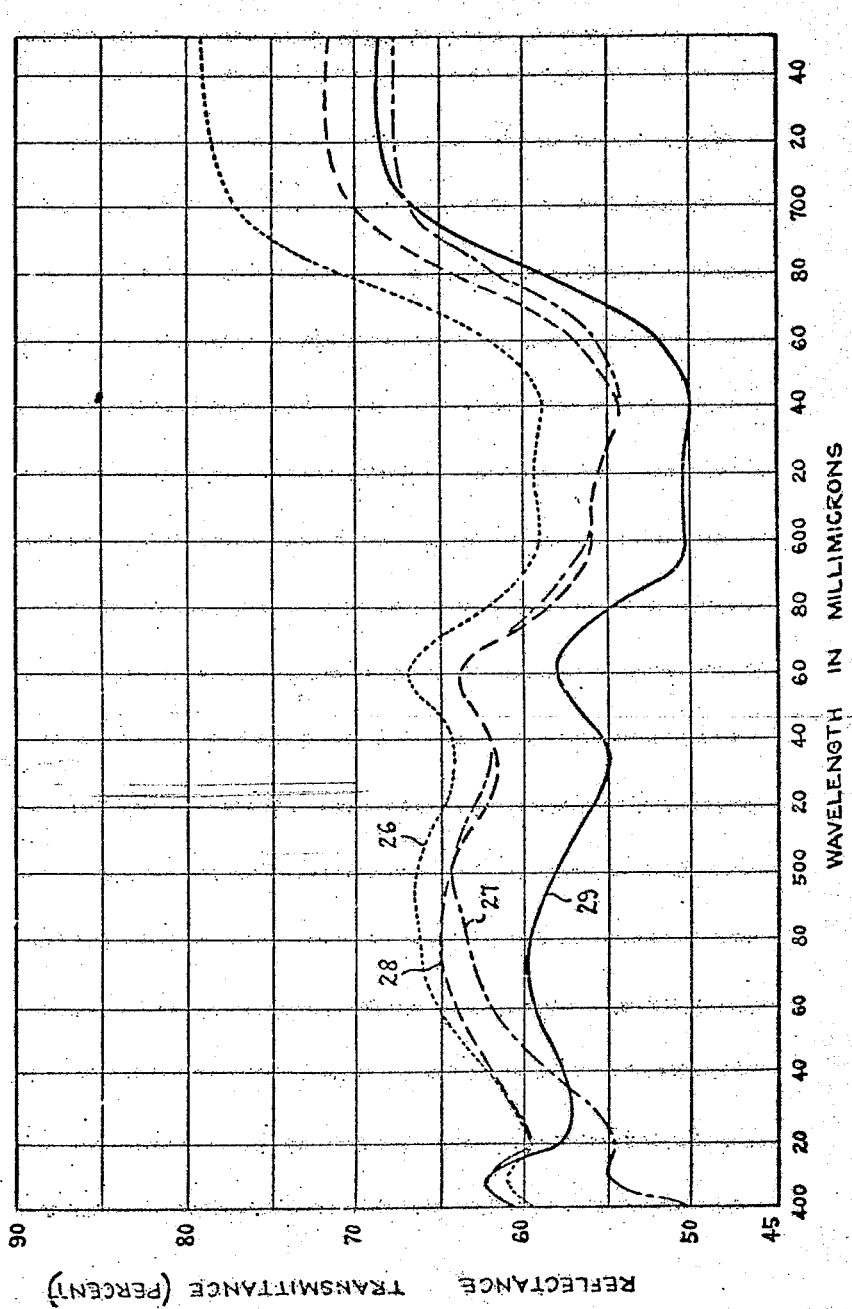
Figure 7:
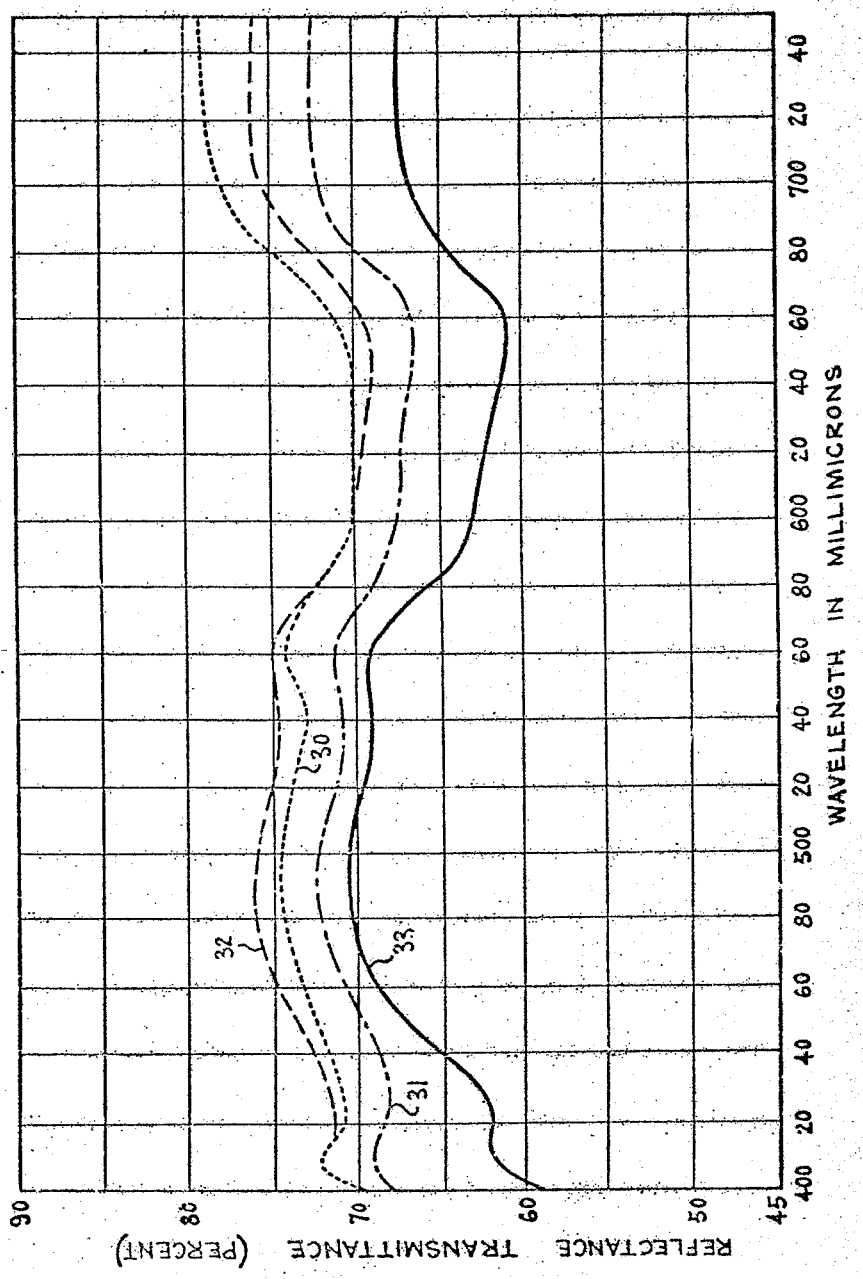

Batches F through M were melted at corresponding time-temperature cycles. The curve indicated by numeral 26 in Fig. 6 indicates the resultant visible transmission curve of the glass of batch F, numeral 27 of batch G, numeral 28 of batch H and numeral 29 of batch I. In Fig. 7 numeral 30 indicates the visible transmission curve of the glass produced from batch J, numeral 31 of batch K, numeral 32 of batch K, and numeral 33 of batch L.

It will be noted that the addition of copper oxide lowers the transmission slightly in the red region of the visible spectrum while additions of silver oxide slightly lowers the curve in the ultra-violet region of the spectrum.

The ultra-violet absorption characteristics of each of the glasses produced by melting the batches listed in Table B are shown in the following Table C:

*Table C*

| Wave length in Mu | U.-V. transmission in percent | | | | | | |
|---|---|---|---|---|---|---|---|
| | Batch A | Batch B | Batch C | Batch D | Batch E | Batch F | Batch G |
| 390 | 36.5 | 32.8 | 45.6 | 48.1 | 31.9 | 13.0 | 37.9 |
| 380 | 21.0 | 18.6 | 32.1 | 32.8 | 15.8 | 9.2 | 22.0 |
| 370 | 7.2 | 6.6 | 17.1 | 16.4 | 3.7 | 2.8 | 8.3 |
| 360 | 1.0 | 0.7 | 5.0 | 4.7 | 0.0 | 0.0 | 1.4 |
| 350 | 0.0 | 0.0 | 0.7 | 0.6 | 0.0 | 0.0 | 0.0 |
| 340 | 0.0 | 0.0 | 0.0 | 0.0 | 0.0 | 0.0 | 0.0 |

| Wave length in Mu | U.-V. transmission in percent | | | | | |
|---|---|---|---|---|---|---|
| | Batch H | Batch I | Batch J | Batch K | Batch L | Batch M |
| 390 | 50.3 | 50.8 | 63.2 | 58.9 | 61.8 | 51.8 |
| 380 | 35.2 | 36.2 | 49.0 | 44.5 | 47.2 | 35.5 |
| 370 | 18.8 | 20.2 | 31.0 | 26.8 | 29.2 | 18.0 |
| 360 | 5.9 | 7.1 | 12.9 | 10.2 | 11.9 | 5.3 |
| 350 | 0.9 | 1.2 | 3.2 | 2.1 | 2.9 | 0.8 |
| 340 | 0.0 | 0.0 | 0.2 | 0.0 | 0.0 | 0.0 |

Figure 3:
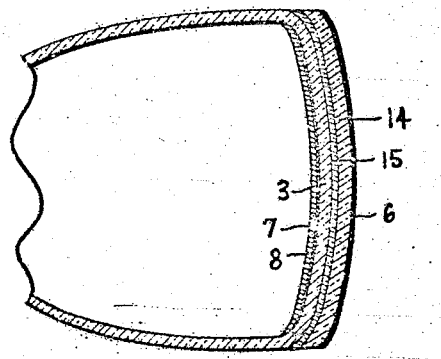
Fig. 3 is a fragmentary sectional view of a cathode ray tube embodying a modification of the invention.
Figure 4:
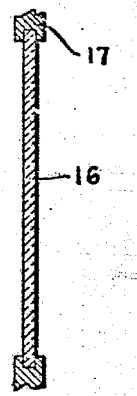
Fig. 4 is a fragmentary sectional view of a filter made in accordance with the present invention.

Since the presently described glasses are intended primarily for use with television, the ultra-violet absorption characteristics are important. Research with respect to the effect of ultra-violet light upon human eyes has disclosed that the threshold of vision of an observer of a television kinescope tube is lowered by the ultra-violet radiation from the kinescope, particularly the ultra-violet radiation below 365 mu. Therefore, by making the face portion 3 of the tube of a glass having ultra-violet absorption characteristics in accordance with the present teachings, this eliminates the harmful effects upon the observer's eyes and results in maintenance of the threshold of vision of the observer at substantially the normal level whereby the observer is able to watch the kinescope with greater ease, less eye strain, and less fatigue. The absorbing glass may, of course, be efficiently used as a laminate 14 cemented as at 15 or otherwise superimposed upon the face portion 3 of the tube, as shown in Fig. 3, or may be made as a separate filter 16 supported by a suitable structure 17 between the tube and the observer.

The present glass further improves upon the prior art by combining with the foregoing advantages the additional advantage that it is slightly colored for increasing contrast discrimination in the image produced on the fluorescent screen of the tube. The color can be defined as green or greenish-blue, and is decidedly advantageous since it will aid in increasing contrast discrimination in the image by absorbing glare and reducing diffusion of the light emanating from the tube as it passes through the glass. The color is so slight, however, that it has substantially no altering effect on the color of the image produced by a kinescope, whether colored or black and white only.

The present glass still further improves upon the prior art by possessing the additional X-ray absorption feature which results in greater safety with respect to the person of and particularly the vision of an observer.

The glass batch formulas, transmission curves, and percentages given hereinbefore are by way of illustration only and should not be limitive of the invention except insofar as they are specifically recited in the appended claims.

The glasses produced by the procedures outlined above have been referred to as being of a controlled color, or more specifically as having a light green or greenish-blue color. Although to a scientist a complete specification of the colors desired for the glasses of this invention can be read from the curves shown in Figs. 5, 6 and 7 in order to better define the color limits which are acceptable within the scope of this invention and to differentiate from prior art glasses of similar types, the colors may be further defined by using the standard observer and coordinate system adopted in 1931 by the International Commission on Illumination. These specifications will all be given in terms of the standard ICI illuminant C, representative of average daylight, of a standard observer, and of a standard thickness of 2.0 millimeters.

Figure 8:
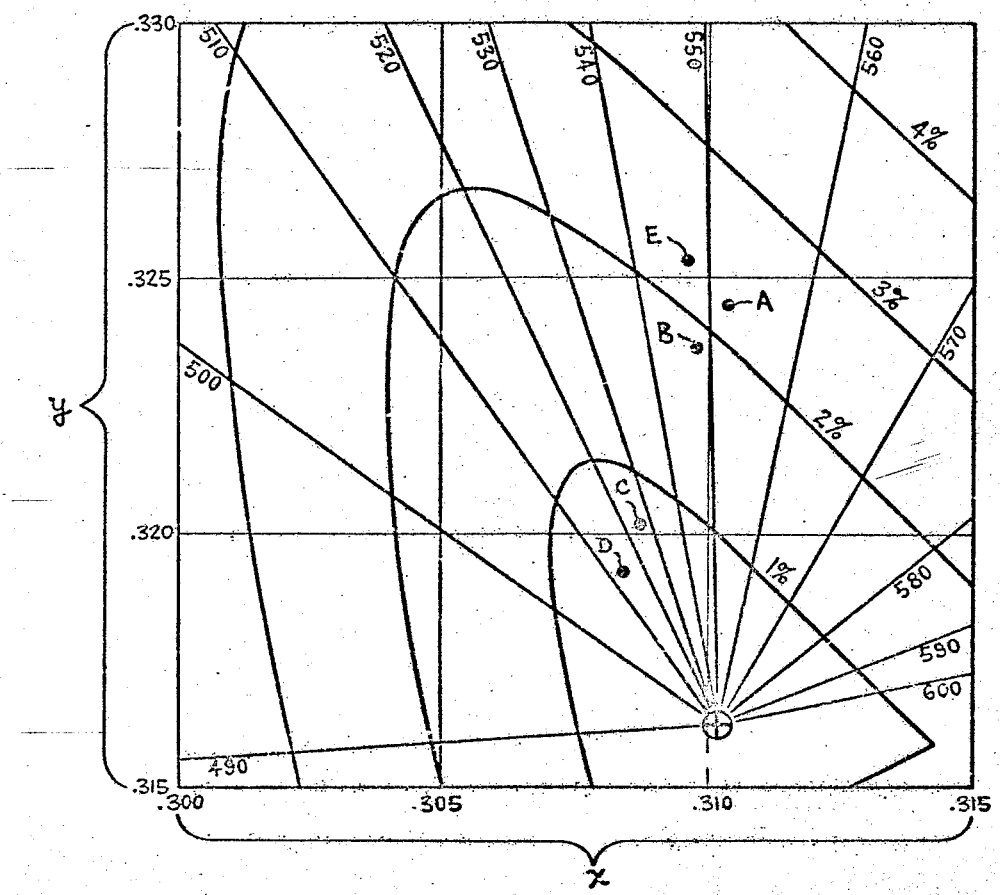
Fig. 8 is a chromaticity diagram diagrammatically illustrating the colors of the glasses referred to in Fig. 5.

With reference to Fig. 8 in the accompanying drawings, there is given a plot of the $x$ and $y$ coordinates in the aforementioned color specification system and the color qualities derived from them, namely the dominant wavelength and the purity of the color being described. The third attribute of color, brightness, as derived from Y, has been found to agree almost exactly with the physical property "visual transmission" previously discussed and quoted for specific glass compositions and limits. Therefore, as previously stated, for the purposes of this invention, this property of brightness can be varied between 48% and 82% according to the particular shade desired and independently of the other two attributes of dominant wavelength and purity.

Referring to Fig. 8, letters A and B indicate glasses produced respectively from batches A and B and indicate the colors of the two examples given hereinbefore. The dominant wavelength, it will be noted, is approximately 550 millimicrons for both, being 551 mu for A and 548 mu for B, and the purity property is approximately 2%, being actually 2.2% for A and 1.9% for B.

However, batches C, D and E produced glasses having colors noted respectively by letters C, D and E in Fig. 8, which colors are also acceptable and well within the scope of this invention. Color E is near the 550 mu wavelength line and has a purity property of above 2⅓%. Colors C and D have dominant wavelengths of approximately 523 mu and 511 mu respectively and have approximate respective purity properties of 1.2% and 0.6%.

The above examples A–E indicate several of the glasses which have been actually produced according to the teachings of the present invention but it is to be understood that many other glasses including the others described herein have been so produced which fall within the scope of this invention, such, for example, as the glasses of batches F–M.

Although throughout the specification manganese oxide has been referred to as used in the various batch glasses as a means for controlling the curve throughout the visible spectrum, it is to be understood that manganese oxide may be partially or completely replaced by cobalt oxide. In instances when the cobalt oxide is used to replace the manganese oxide, a much lower percentage of the cobalt oxide in the vicinity of from .002% up to .01% may be used depending upon the resultant characteristics desired. It is pointed out that cobalt oxide is a much more powerful colorant than manganese oxide and, therefore, larger amounts of the manganese oxide are required in order to obtain substantially the same comparable results.

A cathode ray tube having a transparent face portion 3 made of a glass formed in accordance with these teachings may be further improved as to contrast discrimination of the image produced on the fluorescent screen 7 by providing means for reducing halation caused by reflections of light rays from the surfaces of the glass onto the fluorescent screen. Such means may be in the form of the reflection reduction coatings 6 and 8 provided on the opposed surfaces of the face portion 3. The outer coating 6 may be in the form of any suitable material characterized by its ability to increase the transmission and reduce the reflection of light rays passing through the face portion 3.

Figure 2:
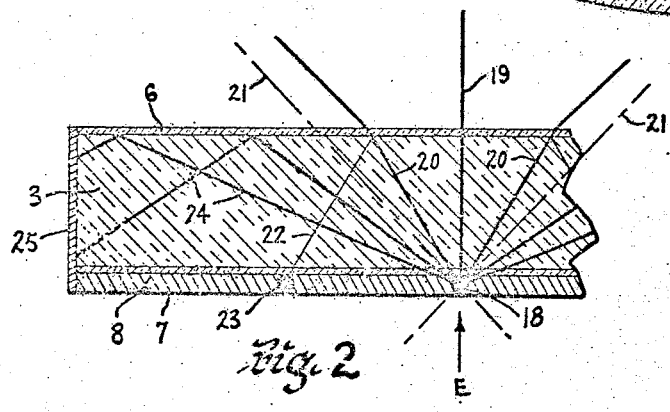
Fig. 2 is an enlarged fragmentary sectional view diagrammatically illustrating the effects of the glass embodying the invention as to one of its uses.

Thus, with reference to Fig. 2, when a particle, for example, of the material forming the fluorescent screen 7, which particle is diagrammatically indicated at 18, is caused to fluoresce by bombardment of the electron beam E, light rays 19 which pass therefrom into the glass 3 will emerge from the outer surface of the glass substantially unaltered except for the absorption thereof by the glass itself. Light rays 20 which are emitted by the particle 18 and which strike the outer surface of the glass at angles less than the critical angle, indicated by line 21, will be partially reflected back through the glass toward the fluorescent screen 7 as indicated by numeral 22. These reflections 22 will, if of sufficient brightness, cause illumination of other particles 23 of the fluorescent screen and thus cause what is known as "halation." However, in accordance with this invention, the absorptive characteristics of the glass plus the low reflection characteristics of the coating 6 will greatly decrease halation.

The inner reflection reduction coating 8 may also be of any suitable type but is preferably formed of a myriad of sub-microscopic, discrete, micro-granular transparent solid particles which form minute projecting irregularities on the glass surface, the concentration of the particles in the irregularities decreasing from the surface of the glass outwardly, and the material of the particles being such that the effective index of refraction of the coating varies from substantially unity at the coating-fluorescent material interface to an index value which progressively increases as it approaches the glass until it substantially approximates the index of refraction of the glass, the total thickness of the coating being preferably of the order of one-quarter wavelength. Such a coating 8, due to the extremely small size of its particles and irregularities compared to the relatively large size of the particles of the fluorescent screen 7, will cause the screen 7 to be spaced from and consequently out of optical contact with the glass 3. Thus, the reflections 22 will be still further prevented from illuminating the screen 7.

The outer coating 6 also aids in providing comfortable viewing of the cathode ray tube by an observer by reducing reflection into an observer's eyes of light rays emanating from sources outside the tube.

Since light rays 24, which emanate from the particle 18 and strike the surfaces of the glass at angles greater than the critical angle will continue on through the glass without emerging, it is further desirable to provide means on the outer periphery of the face portion 3 for rendering the rays 24 ineffective. Such means may be in the form of a highly polished surface for permitting the rays 24 to escape substantially without diffusion, or in the form of a coating 25 of light absorptive material for absorbing the rays 24. Such an absorptive coating may be a suspension of graphite particles in oil or cement such as Canada balsam, or black lacquer, which coating should possess an index of refraction equal to or higher than the index of refraction of the glass.

From the foregoing teachings, a glass which is particularly desirable for use with television kinescopes or other cathode ray tubes can be produced with controlled visual transmission characteristics, color, and ultra-violet and X-ray absorption characteristics by combining controlled amounts of the oxides of manganese, vanadium, silver and copper together with lead oxide in a base crown glass batch and melting under oxidizing conditions within the temperature-time cycles given herein. The resultant glass will, when used in connection with cathode ray tubes, increase contrast discrimination of the image produced on the screen of the tube, absorb ultra-violet radiation and thereby maintain the threshold of vision of an observer at substantially normal level, absorb harmful X-rays, and transmit substantially true color, and when used with reflection reduction surface coatings, with or without peripheral light eliminating means, will greatly reduce halation and thus further increase contrast discrimination in the image.

From the foregoing it will be seen that we have produced means and methods of a simple and efficient nature for producing all of the objects and advantages of the present invention.

It will be understood, however, that many changes may be made in the compositions, structures and methods shown and described without departing from the spirit of the invention as expressed in the accompanying claims, and it is, therefore, not desired that the compositions, structures and methods described be limitive of the invention since the preferred only have been given by way of illustration.

We claim:

1. A glass having controlled ultra-violet absorption characteristics and of a controlled color, said glass being made from a batch mix consisting essentially of a soda-potash-lime-silica base having incorporated therein from about .05 to .15% of vanadium oxide and from about 0.4 to 1.4% of manganese oxide, the soda and potash content together comprising from about 14 to 20%, the lime content not exceeding about 11% and the silica content embodying at least 69%, said glass, for a thickness of approximately 6 millimeters, permitting transmission of less than 13% of ultra-violet at 360 millimicrons in the spectrum and visual transmission of approximately from 45% to 70% at 400 millimicrons, 56% to 76% at 500 mu, 50% to 71% at 600 mu, and 67% to 80% at 700 mu, with an average white of approximately from 60% to 75%.

2. A glass having controlled ultra-violet absorption characteristics and of a controlled color, said glass being made from a batch mix consisting essentially of approximately from 60% to 72% of silica, approximately from 0% to 7% of boric oxide, approximately from 14% to 20% of alkali oxides, approximately from 9% to 11% of a mixture of lime and lead oxide, approximately from 0.5% to 0.2% of fining agents, and the oxides of manganese and vanadium in amounts controlled in accordance with the transmission and color characteristics desired of the resultant glass, with the manganese oxide being in amounts ranging approximately from 4 to 12 times the amount of vanadium oxide and the vanadium oxide comprising from about .05 to .15%, said glass having transmission characteristics for a thickness of approximately 6 millimeters which permits transmission of less than 13% of ultra-violet at 360 millimicrons in the spectrum and visual transmission of approximately from 45% to 70% at 400 millimicrons, 56% to 76% at 500 mu, 50% to 70% at 600 mu, and 66% to 80% at 700 mu, with an average white of approximately from 60% to 70%.

3. A glass having controlled ultra-violet and X-ray absorption characteristics and of a controlled color, said glass being made from a batch mix consisting essentially of approximately from 60% to 72% of silica, approximately from 0% to 7% of boric oxide, approximately from 14% to 20% of alkali oxides, at least 3% of lead oxide, from approximately 0% to 8% of lime, approximately from 0.5% to 0.2% of fining agents, and manganese oxide and vanadium oxide in amounts controlled in accordance with the transmission and color characteristics desired of the resultant glass, with the manganese oxide being in amounts ranging approximately from 4 to 12 times the amount of vanadium oxide, and the vanadium oxide comprising from about .05 to .15%, said glass having transmission characteristics for a thickness of approximately 6 millimeters which permits transmission of less than 13% of ultra-violet at 360 millimicrons in the spectrum and visual transmission of approximately from 45% to 70% at 400 millimicrons, 56% to 76% at 500 mu, 50% to 70% at 600 mu, and 66% to 80% at 700 mu, with an average white of approximately 60% to 70%.

4. A glass having controlled ultra-violet and X-ray absorption characteristics and of a controlled color, said glass being made from a batch mix consisting essentially of approximately from 60% to 72% of silica, approximately from 0% to 7% of boric oxide, approximately from 14% to 20% of alkali oxides, at least 3% of lead oxide, approximately 0.5% to 0.2% of fining agents, from about 0.4 to 1.4% of manganese oxide and from about 0.05 to 0.15% of vanadium oxide, said glass having transmission characteristics for a thickness of approximately 6 millimeters which permits substantially no transmission of ultra-violet below approximately 340 millimicrons in the spectrum and visual transmission of approximately from 45% to 70% at 400 millimicrons, 56% to 76% at 500 mu, 50% to 70% at 600 mu, and 66% to 80% at 700 mu, with an average white of approximately from 60% to 70%, and substantially no transmission of Y-rays generated by 40,000 volt electrons.

5. A glass having controlled ultra-violet and X-ray absorption characteristics and of a controlled color, said glass being made from a batch mix having incorporated therein approximately 67.8% of silica (SiO₂), approximately 4% of boric oxide (B₂O₃), approximately 16% of sodium and potassium oxides (Na₂O and K₂O), approximately 7% of lime (CaO), approximately 3% of lead oxide (PbO), approximately 0.6% of manganese oxide (MnO₂), approximately 0.15% of vanadium oxide (V₂O₅), and approximately 1.5% of antimony oxide (Sb₂O₃), said glass being of such character that at a thickness of approximately 6.37 millimeters it transmits in the visible spectrum approximately 54% at 400 millimicrons, 71% at 500 millimicrons, 67% at 600 millimicrons, and 79% at 700 millimicrons, and transmits in the ultra-violet region of the spectrum approximately 36.5% at 390 millimicrons, 21.0% at 380 millimicrons, 7.2% at 370 millimicrons, 1.0% at 360 millimicrons, and substantially nothing below 350 millimicrons.

6. A glass having controlled ultra-violet and X-ray absorption characteristics and of a controlled color, said glass being made from a batch mix having incorporated therein approximately 67.8% of silica (SiO₂), approximately 4% of boric oxide (B₂O₃), approximately 16% of sodium and potassium oxides (Na₂O and K₂O), approximately 7% of lime (CaO), approximately 3% of lead oxide (PbO), approximately 1.0% of manganese oxide (MnO₂), approximately 0.15% of vanadium oxide (V₂O₅), and approximately 1.5% of antimony oxide (Sb₂O₃), said glass being of such character that at a thickness of approximately 6.22 millimeters it transmits in the visible spectrum approximately 50% at 400 millimicrons, 63% at 500 millimicrons, 59% at 600 millimicrons, and 75% at 700 millimicrons, and transmits in the ultra-violet region of the spectrum approximately 32.8% at 390 millimicrons, 18.6% at 380 millimicrons, 6.6% at 370 millimicrons, 0.7% at 360 millimicrons, and substantially nothing below 350 millimicrons.

7. A glass having controlled ultra-violet and X-ray absorption characteristics and of a controlled color, said glass being made from a batch mix having incorporated therein approximately 67.8% of silica (SiO₂), approximately 4% of boric oxide (B₂O₃), approximately 16% of sodium and potassium oxides (Na₂O and K₂O), approximately 7% of lime (CaO), approximately 3% of lead oxide (PbO), approximately 0.6% of manganese oxide (MnO₂), approximately 0.1% of vanadium oxide (V₂O₅), and approximately 1.5% of antimony oxide (Sb₂O₃), said glass being of such character that at a thickness of approximately 6.33 millimeters it transmits in the visible spectrum approximately 62% at 400 millimicrons, 72% at 500 millimicrons, 68% at 600 millimicrons, and 79% at 700 millimicrons, and transmits in the ultra-violet region of the spectrum approximately 45.6% at 390 millimicrons, 32.1% at 380 millimicrons, 17.1% at 370 millimicrons, 5.0% at 360 millimicrons, 0.7% at 350 millimicrons, and substantially nothing below 340 millimicrons.

8. The method of making an ultra-violet absorbing glass having a greenish-blue color comprising the steps of adding to a glass batch consisting essentially of silica, soda, potash, and lime in proportions sufficient to form a glass and wherein the silica comprises at least 60% of the whole from .05 to .15% of vanadium oxide and an amount of manganese oxide from 4 to 12 times as large as the amount of vanadium oxide, and melting said batch under oxidizing conditions, the proportions of the vanadium oxide and manganese oxide being such as to produce in the resultant glass the desirable color and transmission characteristics similar to the following transmission characteristics as given for a thickness of approximately six millimeters and which permits less than 13% ultra-violet transmission at 360 millimicrons in the spectrum, and visual transmission of approximately from 45% to 70% at 400 millimicrons, 56% to 76% at 500 millimicrons, 50% to 70% at 600 millimicrons, and 66% to 80% at 700 millimicrons, and an average white of approximately from 50% to 70%.

9. The method of making an ultra-violet and X-ray absorbing glass having a greenish-blue color comprising the steps of adding to a glass batch consisting essentially of silica, soda, potash and lime in proportions sufficient to form a glass and wherein the silica comprises at least 60% of the whole at least 3% of lead oxide, and from .05 to .15% vanadium oxide and an amount of manganese oxide from 4 to 12 times as large as the amount of vanadium oxide, and melting said batch under oxidizing condition for a controlled time-temperature cycle so as to produce in the resultant glass the desired color and X-ray absorption and transmission characteristics similar to the following transmission characteristics as given for a thickness of approximately six millimeters and which permits substantially no transmission of ultra-violet below approximately 340 millimicrons in the spectrum, and visual transmission of approximately from 45% to 65% at 400 millimicrons, 62% to 72% at 500 millimicrons, 59% to 69% at 600 millimicrons, and 75% to 80% at 700 millimicrons, and an average white of approximately from 60% to 70%.

10. The method of making an ultra-violet absorbing glass having a greenish-blue color comprising the steps of adding to a glass batch consisting essentially of silica, soda, potash, boric oxide, and lime in proportions sufficient to form a glass and wherein the silica comprises at least 60% of the whole from .05 to .15% of vanadium oxide and an amount of manganese oxide from 4 to 12 times as large as the amount of vanadium oxide, and melting said batch under oxidizing conditions at a controlled temperature within the range of from 2600° F. to 2775° F. and the proportions of vanadium oxide and manganese oxide being such as to produce in the resultant glass the desired color and transmission characteristics similar to the following transmission characteristics as given for a thickness of approximately six millimeters and which permits less than 13% ultra-violet transmission at 360 millimicrons in the spectrum, and visual transmission of approximately from 45% to 70% at 400 millimicrons, 52% to 76% at 500 millimicrons, 50% to 70% at 600 millimicrons, and 66% to 80% at 700 millimicrons, and an average white of approximately from 60% to 70%.

11. The method of making an ultra-violet and X-ray absorbing glass having a slight greenish-blue color comprising the steps of forming a batch containing approximately 67.8% of silica (SiO₂), approximately 4.0% of boric oxide (B₂O₃), approximately 16.0% of sodium and potassium oxides (Na₂O and K₂O), approximately 7.0% of lime (CaO), approximately 3.0% of lead oxide (PbO), approximately 0.6% of manganese oxide (MnO₂), approximately 0.15% of vanadium oxide (V₂O₅), and approximately 1.5% of antimony oxide (Sb₂O₃), melting said batch under oxidizing conditions in a furnace for approximately 1¼ hours at a temperature maintained between 2635° F. and 2700° F. so as to produce in the resultant glass at a thickness of approximately six millimeters the desired X-ray absorption and color transmission in the visible spectrum of approximately 54% at 400 millimicrons, 71% at 500 millimicrons, 67% at 600 millimicrons, and 79% at 700 millimicrons, and transmission in the ultra-violet region of the spectrum of approximately 36.5% at 390 millimicrons, 21.0% at 380 millimicrons, 7.2% at 370 millimicrons, 1.0% at 360 millimicrons, and substantially no transmission below 350 millimicrons.

12. The method of making an ultra-violet and X-ray absorbing glass having a slight greenish-blue color comprising the steps of forming a batch containing approximately 67.8% of silica (SiO₂), approximately 4.0% of boric oxide (B₂O₃), approximately 16.0% of sodium and potassium oxides (Na₂O and K₂O), approximately 7.0% of lime (CaO), approximately 3.0% of lead oxide (PbO), approximately 1.0% of manganese oxide (MnO₂), approximately 0.15% of vanadium oxide (V₂O₅), and approximately 1.5% of antimony oxide (Sb₂O₃), melting said batch under oxidizing conditions in a furnace for approximately 1¼ hours at a temperature maintained between 2635° F. and 2700° F. so as to produce in the resultant glass at a thickness of approximately six millimeters the desired color transmission in the visible spectrum of approximately 50% at 400 millimicrons, 63% at 500 millimicrons, 59% at 600 millimicrons, and 75% at 700 millimicrons, and transmission in the ultra-violet region of the spectrum of approximately 32.8% at 390 millimicrons, 18.6% at 380 millimicrons, 6.6% at 370 millimicrons, 0.7% at 360 millimicrons, and substantially no transmission below 350 millimicrons.

13. An ultra-violet absorbing glass suitable for use as a cathode ray tube face, filter and the like comprising the fused product of a mixture of silica, soda, potash and lime in sufficient proportions to form a substantially homogeneous glass, said mixture further containing vanadium and manganese oxides wherein the proportion of manganese oxide is from four to twelve times the proportion of vanadium oxide, and the vanadium oxide embodies from about .05 to .15 per cent of the whole mixture, said glass for a thickness of approximately 6 millimeters permitting substantially no transmission of ultra-violet below 340 mu and about 45 to 65% at 400 mu, 62 to 72% at 500 mu, 59 to 69% at 600 mu, and 75 to 80% at 700 mu in the visible spectrum, with an average white of approximately from 60 to 70%.

14. An ultra-violet absorbing glass suitable for use as a cathode ray tube face, filter and the like comprising the fused product of a mixture of silica, soda, potash and lime in sufficient proportions to form a substantially homogeneous glass and further containing from about 0.4% to 1.4% of manganese oxide and from about 0.05 to 0.15% of vanadium oxide, said glass for a thickness of approximately 6 millimeters permitting substantially no transmission of ultra-violet below 340 mu and about 45 to 65% at 400 mu, 62 to 72% at 500 mu, 59 to 69% at 600 mu, and 75 to 80% at 700 mu in the visible spectrum, with an average white of approximately from 60 to 70%.

15. An ultra-violet, X-ray absorbing glass suitable for use as a cathode ray tube face, filter and the like comprising the fused product of a mixture of silica, soda and potash in sufficient proportions to form a substantially homogeneous glass, said mixture further containing lead, vanadium and manganese oxides wherein the proportion of lead oxide is at least 3% of the whole mixture, the proportion of manganese oxide is from four to twelve times the proportion of vanadium oxide, and the vanadium oxide embodies from about .05 to .15 per cent of the whole mixture, said glass for a thickness of approximately 6 millimeters permitting substantially no transmission of ultra-violet below 340 mu and about 45 to 65% at 400 mu, 62 to 72% at 500 mu, 59 to 69% at 600 mu, and 75 to 80% at 700 mu in the visible spectrum, with an average white of approximately from 60 to 70%.

16. An ultra-violet, X-ray absorbing glass suitable for use as a cathode ray tube face, filter and the like comprising the fused product of a mixture of silica, soda, potash, boric oxide and lime in sufficient proportions to form a substantially homogeneous glass, said mixture further containing from about .05 to .15% of vanadium oxide, from about 0.4 to 1.4% of manganese oxide, and at least 3% of lead oxide, said glass for a thickness of approximately 6 millimeters transmitting less than 13% of ultra-violet radiations shorter than 360 mu, and about 45 to 70% at 400 mu, 52 to 76% at 500 mu, 50 to 70% at 600 mu, and 66 to 80% at 700 mu in the visible spectrum, with an average white of approximately from 60 to 70%.

ROBERT BOWLING BARNES.
WALTER A. FRASER.

References Cited in the file of this patent

UNITED STATES PATENTS

| Number | Name | Date |
|---|---|---|
| 1,292,148 | Taylor | Jan. 21, 1919 |
| 2,219,122 | Weidert | Oct. 22, 1940 |
| 2,582,453 | Pincus | Jan. 15, 1952 |